US009268969B2

(12) United States Patent
Gault et al.

(10) Patent No.: US 9,268,969 B2
(45) Date of Patent: Feb. 23, 2016

(54) SYSTEM AND METHOD FOR FIELD-VERIFIABLE RECORD AUTHENTICATION

(71) Applicant: GUARDTIME IP HOLDINGS LIMITED, Tortola (VG)

(72) Inventors: Michael Gault, Hong Kong (HK); Risto Laanoja, Tallinn (EE); Ahto Buldas, Tallinn (EE); Martin Ruubel, Tallinn (EE); Peter Rajnak, Singapore (SG); David F. A. Piesse, Hong Kong (HK); Jian Tan, Belle Mead, NJ (US); Jeffrey Pearce, Hilo, HI (US)

(73) Assignee: GUARDTIME IP HOLDINGS LIMITED, Tortola (VG)

( * ) Notice: Subject to any disclaimer, the term of this patent is extended or adjusted under 35 U.S.C. 154(b) by 0 days.

(21) Appl. No.: 13/966,297

(22) Filed: Aug. 14, 2013

(65) Prior Publication Data

US 2015/0052615 A1 Feb. 19, 2015

(51) Int. Cl.
 G06F 21/00 (2013.01)
 G06F 21/64 (2013.01)
 G06F 21/60 (2013.01)
 G11B 20/00 (2006.01)
(52) U.S. Cl.
 CPC .............. *G06F 21/645* (2013.01); *G06F 21/60* (2013.01); *G11B 20/00086* (2013.01)
(58) Field of Classification Search
 CPC .. G11B 20/00086; G06F 21/60; G06F 21/645
 USPC ........................................... 726/26; 713/176
 See application file for complete search history.

(56) References Cited

U.S. PATENT DOCUMENTS

| 6,944,648 | B2 | 9/2005 | Cochran et al. |
| 2004/0172476 | A1* | 9/2004 | Chapweske ............. H04L 29/06 709/231 |
| 2005/0063545 | A1* | 3/2005 | Fujimoto et al. .............. 380/277 |
| 2005/0138382 | A1* | 6/2005 | Hougaard et al. ............ 713/176 |
| 2006/0117182 | A1 | 6/2006 | Wolff ............................. 713/176 |
| 2007/0086061 | A1* | 4/2007 | Robbins ........................ 358/400 |
| 2010/0158254 | A1* | 6/2010 | Schaad et al. ................. 380/282 |
| 2012/0324229 | A1* | 12/2012 | Buldas et al. ................. 713/176 |
| 2013/0050512 | A1 | 2/2013 | Gonser et al. |
| 2013/0159720 | A1 | 6/2013 | Gonser et al. |
| 2013/0198854 | A1* | 8/2013 | Erway ..................... H04L 9/008 726/27 |
| 2013/0247218 | A1* | 9/2013 | Jhingan et al. .................. 726/27 |

(Continued)

OTHER PUBLICATIONS

Warasart, Maykin, et al., "Paper-based Document Authentication using Digital Signature and QR Code", 2012 4th International Conference on Computer Engineering and Technology (ICCET 2012), May 2012, Bangkok, Thailand.

Kuacharoen, Pramote, "Design and analysis of methods for signing electronic documents using mobile phones," Int. Conf. on Comput. Applicat. and Network Security, May 2011, Maldives.

(Continued)

*Primary Examiner* — Michael Pyzocha
(74) *Attorney, Agent, or Firm* — Jeffrey Pearce

(57) ABSTRACT

A code is added as a marking to a document and encodes an identifier that maps to a copy of the document stored in a database. Database copies of stored documents are preferably digitally signed. Using a device such as a smart phone, a user may extract the document identifier from the marking on a purported authentic version of the document and retrieve a copy of the document from the corresponding location in the database. The user can then visually compare the purported authentic version of the document with the retrieved database copy.

25 Claims, 8 Drawing Sheets

(56) References Cited

U.S. PATENT DOCUMENTS

2013/0276058 A1* 10/2013 Buldas .................... G06F 21/64
726/2
2015/0039893 A1* 2/2015 Buldas .................. H04L 9/3239
713/176

OTHER PUBLICATIONS

Blackledge, Jonathan, et al., "Printed Document Authentication using Texture Coding", ISAST Transaction on Electronics and Signal Processing, vol. 4, issue: 1, pp. 81-98, 2009.

* cited by examiner

SYSTEM AND METHOD FOR FIELD-VERIFIABLE RECORD AUTHENTICATION

FIELD OF THE INVENTION

This invention relates to an electronic system and method for verifying that a document is authentic.

BACKGROUND

A policeman on the street looking at a driving license, an inspector looking at a business permit, an admissions officer looking at a diploma or grade transcript, a security guard looking at an ID badge, a potential buyer looking at a land title, and countless others who are presented with "original" or "official" documents must often ask themselves: "How do I know this document is authentic and unaltered?" This issue of document authentication has existed at least since ancient Mesopotamians rolled engraved cylinders onto clay tablets. Ever since, European monarchs, Asian emperors, popes and officials have been pressing signet rings into melted wax or rolling jade yinzhang onto parchments and scrolls. Indeed, in many cultures throughout history, possession of the official document seal was itself seen as proof of legitimacy and ruling power. Even today, there is often a requirement for notarization or obtaining an apostille for many types of documents. Now that documents may be created, altered, and copied with only a few keystrokes and clicks of a mouse, the question of provable authenticity is as important as ever.

One disadvantage of existing document verification schemes is that they are often inconvenient at best, frequently impractical, and sometimes expensive. For example, it may not always be convenient to have to find a notarius publicus for domestic legalization of a document, or to submit the document to the appropriate Foreign Ministry agency responsible for overseeing apostilles according to the Hague Apostille Convention. At a less international level, it may be impractical to have to return to one's university to get a certified copy of past diplomas or grade transcripts. In some circumstances, it may in practice be nearly impossible to verify the authenticity of a presented document—the police officer, for example, will in general have no reasonable way to check that driving licenses presented at a routine traffic stop do not have fake photographs or altered birthdates. Other expensive methods of prevention of physical documents forgery include special printers, papers, holograms, watermarking, etc., such as are used to create passports and paper money. These methods make it more difficult or expensive to forge, but still do not offer instant or even convenient verification of the source of the document without correspondingly specialized technology and training.

Even the supposedly high-tech world of inventions and patents still sometimes functions in the era of ribbons, seals, and embossing tools: patent applicants who file applications in their home countries normally are required to get physical, officially certified "priority documents" from their respective national patent offices and send these to foreign firms for submission to foreign patent authorities in order to establish the right of priority.

Another disadvantage is that the use of physical seals still does not rule out the possibility of alterations or outright counterfeiting. This is especially true where official documents are easily forged, officials may be bought off or at least difficult to contact for confirmation, or of questionable reliability themselves. In the United States, for example, there are often minimal requirements to become a "notary public", who may often be in a distant state. On the other side of the globe, even now it is common for Chinese businesses to have their official seal, which they use to "chop" company documents. Such seals, however, are often made in small shops and can be easily reproduced. Of course, with the advent of high-resolution color laser printers, the ease of creating fully believable counterfeits of official documents and even seals has increased dramatically. These circumstances simply raise the question of trust to a higher level, that is: "How can I trust that this official seal proves authenticity of this document?"

Still another drawback of many existing document verification systems is that they presuppose immediate access to technology that may simply not be available in many real-life situations—despite the seeming ubiquity of portable computers, they are not always available. For example, a policeman on foot may want to be able to check that the photo on an ID document actually corresponds to the person the ID document supposedly belongs to.

What is needed is therefore some system and method for verifying documents that is convenient, easily accessible, and more trustworthy and believable than existing solutions.

DETAILED DESCRIPTION

Various aspects and examples of embodiments of the invention are described below. Common to these, however, is that they enable a convenient, flexible, yet highly secure way to authenticate documents that, depending on the chosen implementation, is suitable even for use in the field. As is explained in greater detail below, one optional but preferred aspect of the invention—digital signing using a keyless, distributed hash tree authentication infrastructure—can provide a mathematically provable high level of certainty that a document has not been altered even in an environment where one does not trust the certifying authority.

Figure 1:
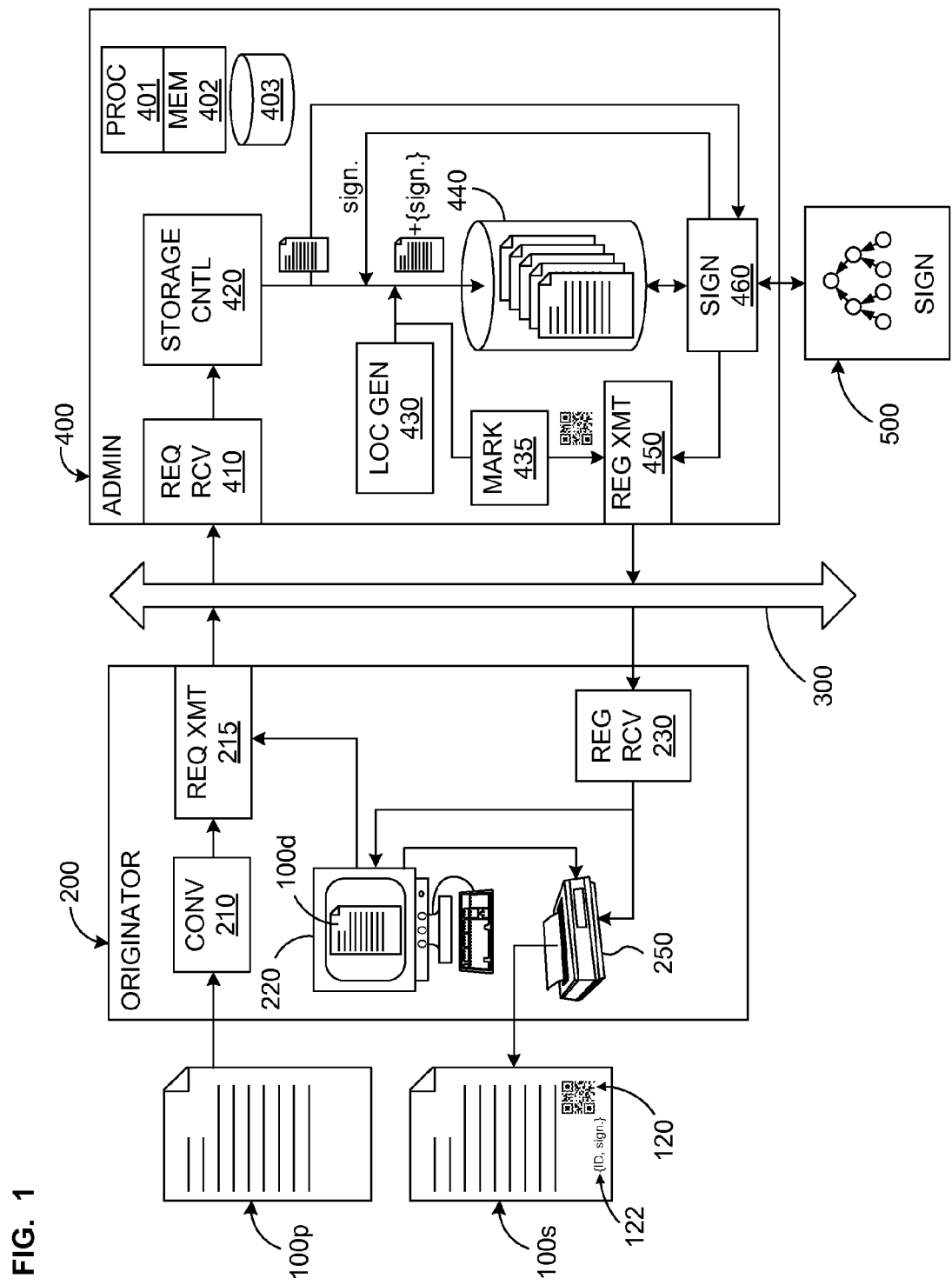
FIG. 1 illustrates the main system components and their functions used in a registration phase.

FIG. 1 illustrates an embodiment of the invention in a registration phase or mode, including an origination system (or "originator", for short) 200, an administrator system 400, and a network 300 over which they can communicate. In some simple implementations, it would be possible to combine the originator 200 and the administrator system 400 into a single entity, in which case the network 300 and the various components that enable communications over the network may not be necessary. Although the figures illustrate only a single originator 200, in most implementations of the invention, there may be any number of such origination systems— even thousands or millions—each of which will be configured functionally as shown and described here.

In most implementations, the administrator system 400 will be a server with its own internal storage, but this is also not necessary, except as needed for the operation of the server itself—as is well known, both computational tasks and data storage may nowadays be distributed in a "cloud" computing environment. The originator 200 may also be a server, but thanks to the simplicity of certain embodiments of the invention, it would also be possible to perform all of the functions of the system within a single workstation, or even a personal computer or laptop computer; indeed, the originator could be incorporated into portable devices as long as they are able to image documents or enable manual data input, load and execute software, and communicate over a network.

Assume that one wishes to be able to certify the authenticity of a document. For the moment, merely by way of example, assume this is a physical document 100*p*. In order to process this document, it is first preferably converted into digital form by a physical-to-electronic conversion device 210 such as a scanner, digital camera, etc. As FIG. 1 illustrates, however, the invention may also work with documents originally created in digital form either instead of or in addition to physical documents. Accordingly, FIG. 1 shows a computer, such as an operator console 220, on whose screen a digital document 100*d* is displayed. Such a digital document might be, for example, a totally original work, a template that an operator is completing, etc. Note that it is not necessary for a document to be wholly even partially textual; rather, either or both of the physical and electronic documents 100*p*, 100*d* could include or consist primarily of graphical portions, such as works of art, architectural or engineering drawings, etc. In other words, this invention is not limited to any particular type of document. On the other hand, it is assumed that someone wishing to verify the authenticity of a presented document will do so primarily through visual comparison with an electronically stored version of the original. In such cases, however the physical or electronic document is converted and later stored, it should be in a format suitable for re-creation of the original in visible form.

Using any known file transfer format, the electronic version of the original document is sent along with a registration request by a corresponding module 215 within the originator 200. This request transmission module 215 will include conventional hardware and software components to allow network access, network communication with the administrator 400, and data transfer. This could be implemented using dedicated software with a hard-coded network address to the administrator (to reduce the likelihood of malicious redirection), or simply a submission with document attachment following online instructions on a web site generated by the administrator 400 itself, or any other know method for communicating online requests and transferring a document. A corresponding registration request reception module 410, included within the administrator 400, then senses, preferably acknowledges, and receives the registration request for the document 100*p*, 100*d*. A storage controller 420, which in most cases will be a software module, then stores the electronic document copy in a database 440, along with any chosen metadata, including, for example, information identifying the originator, time, etc., at a database location determined by a location generation module 430.

In one preferred embodiment, the electronic copy to be stored in the database 440 is first digitally signed using a signature module 460 that associates unique signatures with each document. In the preferred embodiment, the signature module 460 obtains digital signatures by communicating with a data-signing system 500. A particularly reliable and efficient example of suitable data-signing system 500 is described below.

At least two identifiers are preferably associated with each document: a document identifier that, as its name implies, identifies a particular document, and a location identifier, which indicates its storage location in the database 440. Depending on the chosen implementation, a single character string (such as a number) could serve as both (such as where each identifier is in the form of a URL), and there may of course also be different mappings or other conversions of one identifier into some other, such as to enable convenient organization and administration of the database, for example, when deleting or disabling access to documents according to some chosen retention policy. The document identifiers may have a structure and/or they may be generated in whole or in part as a random alphanumeric character string. The administrator system 400 may generate and assign the document identifier for each received document, for example using a suitable routine within the storage controller 420. In other implementations the document identifier may be received along with the request to register the document for verification; for example, driving licenses and passports will already be identified by unique numbers, and these could if desired be retained for use as the document identifiers. The invention is not dependent on any particular scheme for generating document identifiers. In response to a registration request, the document identifier is preferably returned, with or without encryption.

Depending on what network is used and how files are stored and accessed, any storage address scheme may be used. In most implementations, the database will have its own addressing convention, such that the storage controller 420 will map (for example, using a suitable, conventional address look-up table) received document identifiers to corresponding database record locators so as to access the appropriate database records. As such, a received document identifier may act as a kind of search key that, after any needed translation, points to the correct corresponding location of the relevant record in the database 440. Given a document identifier, the stored copy of the document can therefore be accessed and image of the document can be viewed and, if such permission is implemented, downloaded, by any authorized user who addresses the network using a valid document identifier. One possible (albeit typically more easily compromised) design choice would be to implement the document identifiers as URLs, including respective unique website sub-domains, which then can be submitted directly as web addresses when requesting document verification; the storage controller 420 can then translate received URL/sub-domain identifiers into the proper respective database locators.

A mark-generation component 435 is preferably included in the administrator system to convert the assigned document identifier into a form suitable for printing as a machine-readable marking 120 that encodes the assigned document identifier. As discussed elsewhere, the marking 120 may also encode other information, depending on the specifications of any given implementation of the invention. There are many possible ways to implement the marking 120, from purely alphanumeric characters, to one- or two-dimensional bar or dot codes, to purely image-based codes. System designers will choose a suitable marking 120 based on such factors as the amount of information it is to encode and the ability to decode it accurately using the devices expected to be used in a later verification stage. Because a later document submitted for authentication will in general bear the marking 120, the copy of the document stored in the database preferably also has the marking on it as well such that the stored copy will be visually identical to any document later presented for authentication.

Figure 3:
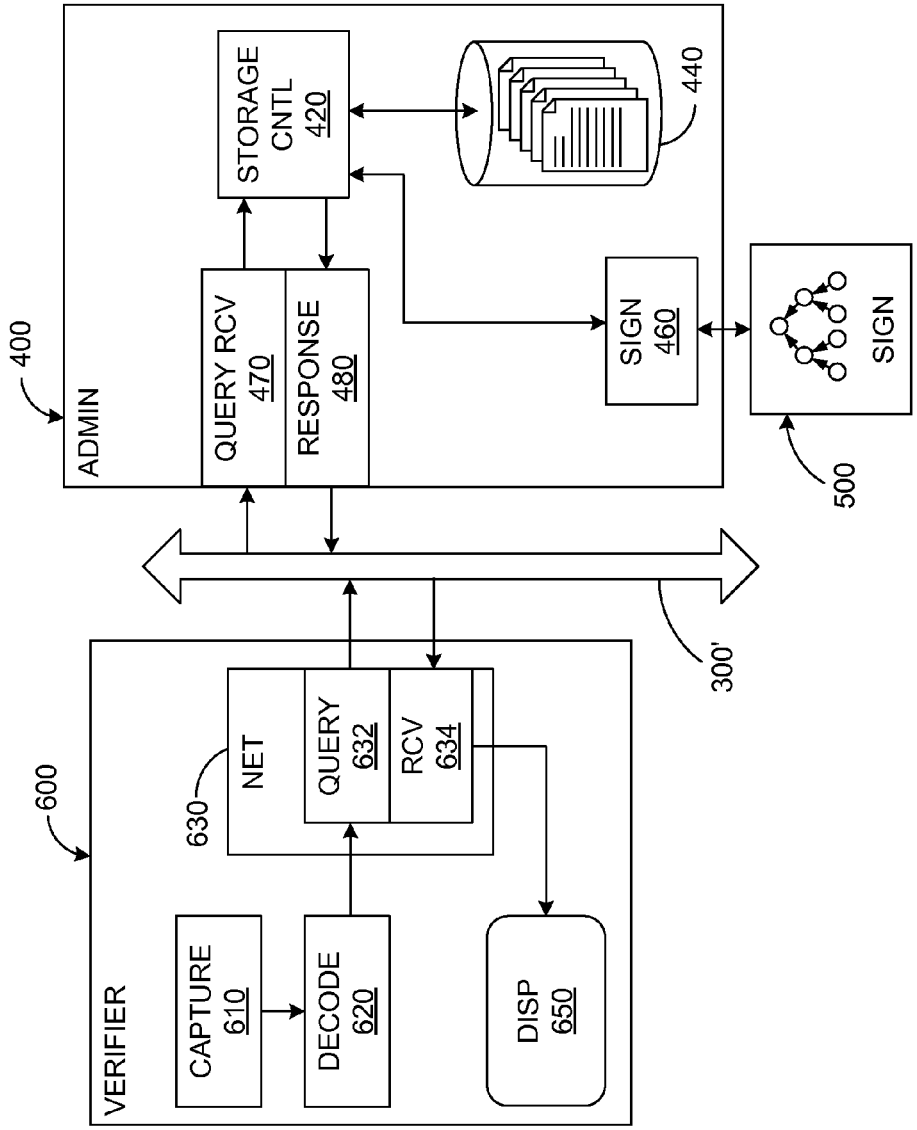
FIG. 3 illustrates the main system components and their functions used in a verification phase.

In FIGS. 1 and 3, the database 440 is shown as being part of the administrator system 400. Functionally, this will typically be so, but it is not necessary to this invention for the database to reside in the same physical or even virtual server as the other components; rather, all or any chosen part of the database could be implemented using remote or even "cloud" storage. Using the preferred data-signing infrastructure described below, the integrity of individual, registered documents, and even the database as a whole, can be proven regardless of where it physically or logically resides.

As FIG. 1 shows, the administrator system 400 may include a data signature request module 460, which is configured to request data signatures from a data-signing system 500. A data signature is preferably requested and obtained for each document stored within the database 440. The signature may be generated based on the original document contents alone, but preferably, for increased security, is based on the combination of the original contents plus the marking 120. It is also possible to digitally sign the contents of the database 440 as a whole, on any schedule preferred by the system designer, such as periodically, upon every change to the database contents, etc. Note that the feature of obtaining digital signatures for the database 440 contents and/or for individual documents stored in the database will greatly increase the confidence of users in the reliability of the authentication service, even if they have reason to question the integrity of the service as such. In fact, using the data signature infrastructure described below, the integrity of each registered document may be guaranteed to users with almost mathematical certainty.

A query response module 450 may then communicate with a corresponding registration reception module 230 over the network 300 and pass the document identifier assigned or otherwise associated with the image of the original document that has been stored in the database 440 and/or its corresponding marking from the module 435. The corresponding digital signature for the newly registered document may also be included in the response. As an alternative, the electronic representation (for example, in pdf) of the stored document may be stored in the database with the marking already included on it, and the already marked electronic version of the document may be transmitted back to the requesting system as part of the registration response. Other information may also be transferred to the originator, such as the digital signature (if one was obtained), confirmation information, etc. In some implementations of the invention, the end result of the registration phase will be a physical document bearing a marking 120 that encodes at least the associated document identifier; in others, the end result may be a purely electronic version of the document on which the marking 120 is unremovably superimposed or added, and that is transferred back to the operator console 220.

Additional information about stored documents may be included in the database 440. For example, documents often have associated metadata such as an issuer ID, a document number, validity period, etc., which may be used for document revocation. The metadata for a document may be entered manually during its initial input and registration, automatically by the system that issues or creates the document, extracted using OCR, etc.

As for expiration, an expiration time or validity period may optionally be stored in the database 440 along with any or all of the registered documents. Before returning a document for viewing in response to a verification query, a component within the administrator system 400, such as the storage controller or query response module 450, can check whether the requested document's stored copy has expired and, if so, take any of a range of actions, from denying the request to access the copy, to simply transmitting a notice of expiration. Depending on the amount of information the marking 120 can encode, an expiration date could also be encoded in the marking 120 itself, such that a later verification system 600 (see below) can determine whether a request for document verification falls within the validity period before allowing a query to be submitted.

FIG. 1 illustrates that the marking 120 is generated within the administrator system 400, in particular, by the module 435. This is a design choice. Instead, it would also be possible for markings 120 to be generated within the originator 200, if the system is implemented such that the administrator system returns the document identifier in "raw" form to the requesting, originating system. There are, however, advantages to generating the markings 120 within the administrator system 400. One advantage is consistency: It will be possible to ensure that marks are generated with the proper format, resolution, security and encoding. Another advantage is that it will often reduce the level of doubt users may have about the correctness of the marking 120 that has been placed on the document 100s. In general, the "higher" the system is in the hierarchy, the more reliable most users will find it to be. For example, users in most (but sadly, not all) countries will tend to trust the integrity of a system run by a nationally administered agency more than a system under the control of a local official or private entity. Fortunately, as is described below, one embodiment of this invention incorporates a form of digital signature that eliminates the need for trust essentially altogether.

The marking 120 therefore preferably encodes information in a machine-readable form sufficient to allow access, using the encoded document identifier, by a viewer to a copy of a document stored in the database 440. One form of machine-readable marking that has already gained nearly worldwide acceptance for encoding network addresses and other short textual information such as the document identifier is the Quick Response (QR) Code. Already, QR code-reading software is incorporated into many devices such as "smart" telephones and tablet computers for reading QR codes and automatically extracting the encoded URL, which is then accessed by a browser within the device.

Different versions of the QR code (as well as of similar codes) can encode different numbers of alphanumeric characters, depending on the level of error correction included and the granularity of the code pattern itself. System designers will know which version of a given code to use based on such factors as how much information it is to encode and under what conditions and using what devices users will need to read the code. For example, if the marking 120 is to encode only the document-specific identifier, and this identifier is not too long, then a lower version of the QR or similar code might be appropriate. On the other hand, if the marking 120 is to encode not only the identifier but perhaps other information such as the data signature, then a higher version of the QR or similar code may be necessary.

Although the QR code has already gained wide acceptance, the invention does not require any particular encoding scheme for the marking 120 and in fact there are other schemes in use even today. One such alternative is Microsoft Tag. Some other alternatives include Data Matrix and PDF417. Still other alternatives are non-barcode-based schemes that might, for example, include markings made up of alphanumeric characters in a particular pattern or shape that can be captured from images and interpreted using OCR to extract the encoded document identifier. The document identifier could then optionally be encoded into the marking 120 in the form of a cryptogram that only dedicated reading software can decode back into the document identifier, thereby providing an additional level of security and making it harder for malicious actors to falsify the marking 120 and cause a redirection to an incorrect image The document identifier could also be derived from the document content itself. For example, passports, many ID cards, etc., have machine-readable zones that could include alphanumeric characters or other information that could serve as, or as the basis for, the identifier. It is also not necessary for the marking 120 to be visual/optical. One alternative would be to "mark" the document electrically or digitally, such as encoding its identifier in a read/write RFID tag or a programmable smart chip, such as is found in biometric passports, many bank cards, etc. The document identifier could also already be in some way associated with the document. For example, if the contents of an electronic file are the document, then the file name could be used as a natural identifier, or the title of the document as written, etc.

Figure 2:
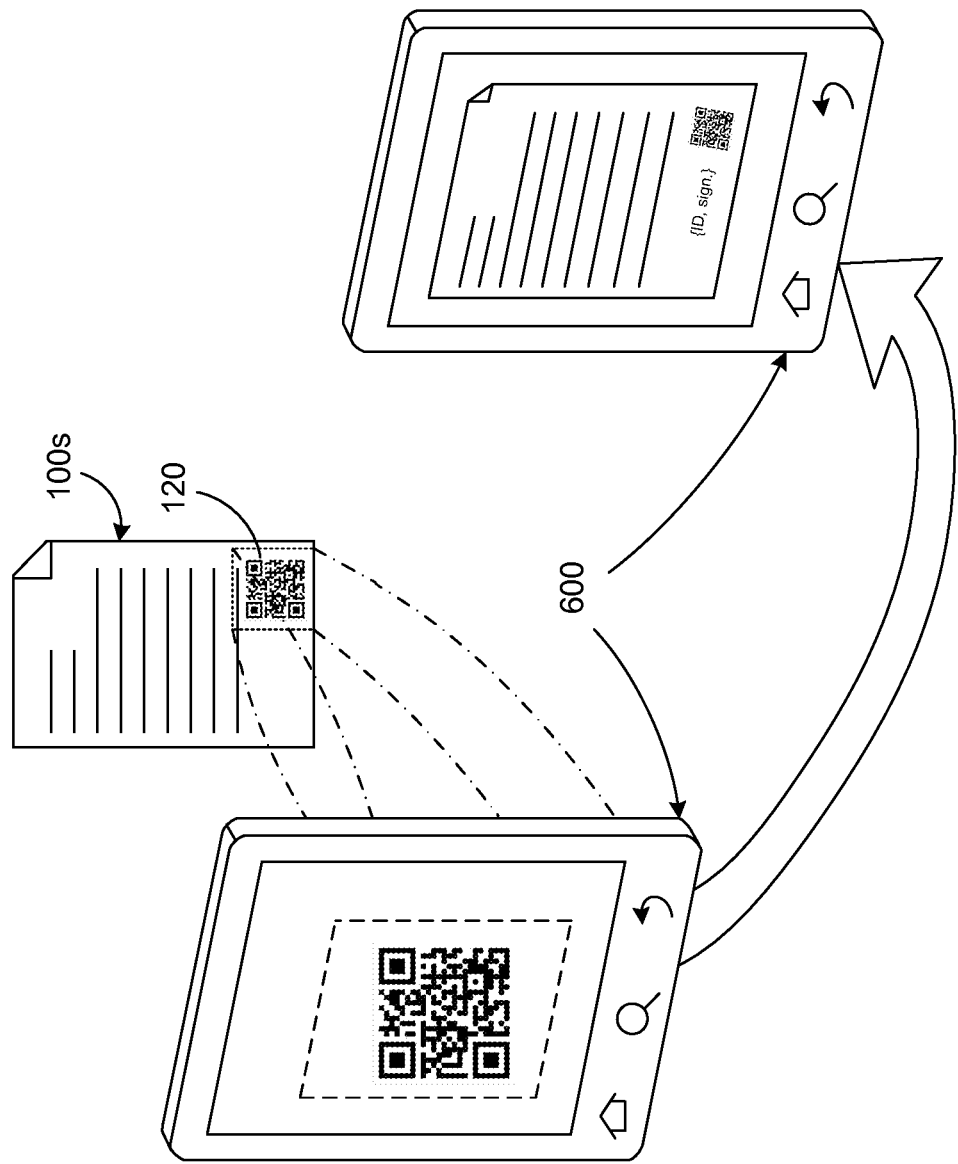
FIG. 2 illustrates how a user may verify a previously registered document.

FIG. 2 illustrates a verification phase or mode from the perspective of a user who wishes to verify a purportedly authentic "candidate" copy of document 100s, which is claimed to be identical to the original document 100p, 100d in the sense that it is either essentially visually indistinguishable, or has an identical digital representation, or both. Note that in some cases there may be more than one "original", such as multiple print-outs of a single electronic file, etc. The user may then point a fixed or portable network-enabled device 600 such as a smart phone, tablet computer, etc., that includes code-reading software for images captured by an internal camera so as to capture and decode the marking 120. Using known techniques, the device 600 then, via a network access module 630, either automatically or under user control, may access the network and submit the document identifier as encoded within the marking 120.

To increase security and reliability, however, the correct network address back to the administrative system is preferably pre-stored in the network access module 630 and the document identifier is passed to the administrative system by the module 630. Note that it would in this case also be possible for the information in the marking 120 to be encrypted, with decryption occurring within the network access module 630 (or later in the administrative system itself); the network access module 630 may then also transmit access control information to ensure that the network access module 630 is in fact authorized to make verification requests to the administrative system. It would also be possible to implement any of various ways to authenticate the verification system 600. One way would be to use a site certificate (https:// . . . ), verifying a data signature on the downloaded document, using a dedicated application (for example, from a trusted appstore) within the network access module 630 that handles the verification, using keys or hardcoded server locators associated with the verification system 600, etc.

As with any other network-connected server, the administrator system 400 then accesses the database 440 at the respective identifier-indicated position and returns the stored copy of the original to the device 600 so that the user can view it. The user can then compare the image of the stored original with the document presented to see if there are any discrepancies or if the presented document is in fact visually identical to the document that was originally stored in the administrator system. Depending on the implementation, it would also be possible for a corresponding software module loaded within the device 600 to extract and verify the data signature if such is also encoded in the marking 120 or returned separately along with the image.

One other alternative would be for the originator 200 to transmit to the administrator system secondary receipt information, such as the email address of some other desired recipient. The administrator system 400 could then transmit to that secondary recipient a copy, for example in pdf or other printable format, of the registered and marked document for remote or additional printout. Such secondary copy requests are now found, for example, when booking airline reservations—one can specify the email address of other recipients, who then automatically receive a copy of the confirmed itinerary. To avoid creating multiple "originals" in the case the marking 120 is to be printed onto a single physical original, the system could generate a visible watermark on all secondary copies. Recipients of secondary copies would then have a copy with the marking 120, so that the secondary copy would allow access to viewing the originally stored copy, but the secondary copy would be marked to as not to be confused with the "real" document.

Although FIG. 2 illustrates the verifying device 600 as being a handheld device such as a smart phone or tablet computer, this is not required according to the invention. It would also be possible for one or more of the verifying devices to be a larger computer or workstation that includes a camera or similar optical device or reader that is able to capture and allow for decoding of the marking 120. Note that the word "camera" should be viewed broadly to include any type of device that is able to capture and convert an image into electronic form for processing. When it comes to smart phones, tablet computers, and webcams incorporated into larger computers, the device will in almost all cases in fact be a form of camera. Nonetheless, it would be possible to use other devices such as a scanner instead, with or without OCR capability, depending on the chosen type of marking. Still one other possibility would be for the document identifier (such as field 122 on document 100s in FIG. 1) and/or a data signature (see below) to be printed on the document in a form that can enable the user to manually enter it into the verification system; such an embodiment would allow use of the main verification features even where no marking-imaging and interpretation functionality is available.

FIG. 3 illustrates the verification phase from the system perspective. Here, the verification device 600 is shown as including a module 610 that will comprise the camera or other image-capture or reader or manual data-input device along with any necessary software component to present the captured image or otherwise input data to a decoding module 620 in a form that allows for extraction of the document identifier (possibly in encrypted form) within the marking 120. The document identifier is then passed to the network access module 630, which will include conventional components 632, 634 necessary to submit a query to the network, receive the response, and display the associated stored image on a display 650. Although it is possible to use known software components for launching a browser within the verifying system 600 and directing it to the decoded document identifier, it is preferable for the software modules that perform these functions to be provided by a known and preferably trusted source (for example, through a known "app store" such as is now available for Android-based devices from Google, Inc. or for iOS-based devices from Apple Corp.) or otherwise certified by the overall system administrator in order to reduce the likelihood of malicious software causing network address misdirection. One other security measure that may be implemented to reduce the ability of malicious actors to misdirect verification queries would be for an application that comprises the network access module 630 to have a "white list" of allowed network addresses that includes the network address of the administrator system 400 to which queries are to be directed.

The administrator system is accordingly provided with components 470, 480 to receive the query, including the document identifier, and submit it to the storage controller 420, which then retrieves the corresponding document image from the database 440, whereupon the response component 480 formats it and returns it via the network to the verifying device 600.

In the preferred implementation in which each document is digitally signed, the storage controller 440 preferably verifies the retrieved digital document before it is returned to the verifier 600. If this process fails, indicating that the stored document has in any way been altered since being stored, then the storage controller may instead generate an error message not only to the verifier but preferably also to the overall system administrator or any previously designated supervisory system or agency.

FIGS. 1 and 3 show several different software components within each of the originating system 200 and the administrator system 400. It is not necessary to configure these components separately within each device, but rather they may be combined into larger, single software modules as long as they perform the same functions. Skilled programmers will of course know how to configure the various software components for maximum efficiency and according to other design goals. As is also well known, the originating system 200 and the administrator system 400 (as well as the verifying system 600 described below) will include conventional hardware, firmware and software such as one or more processors (such as component 401 in the administrator system 400), memory (402 in the administrator 400), non-volatile storage (such as a disk 403), etc., that enable each respective system to load and execute the computer-readable instructions that comprise the software components used by various aspects of this invention.

As system designers will understand, the various computational, coding/decoding, control and administrative modules, etc., within the originating system 200, the administrator system 400, the verifying system 600 and the signing infrastructure 500 comprise computer-executable instructions that may be provided, stored, loaded and executed from any known computer-readable storage medium, including downloading the code over a network into memory or other storage units, on physical media such as CD-ROM or other disks, on optical or magnetic storage media, on flash or other RAM-based memory devices, etc The software modules that perform the various tasks that define this invention may be made available in any known method, such as being loaded from a CD-ROM or other disk or optical or electromechanical medium, a flash drive or other memory device, by online downloading, etc.

Note that it would also be possible to use a single device both as an originator 200 and a verifier 600, depending on the intended implementation. For example, in the registration phase, a tablet computer or smart phone or computer could be configured to use its internal or attached camera to image a document, or to transmit some other internally created document such as an invoice or order, and then access the administrator system 400 to record the document. It could then also function as a verifying device for other marked documents, or even for the original document it caused to be registered, if that document was printed out physically.

At this point, one can appreciate the flexible reliability of the invention. In fact, given a network-enabled device 600 configured to read the marking 120, which almost all modern smart phones and tablet computers can already do, all that is needed for a user to be able to visually verify a document presented to him is that the document should be marked as described here and his device should be able to capture and decode it and connect to the whatever network is used to communicate with the administrator system 400.

The registration and verification phases described above allow a user to view a stored copy of a previously registered document to compare it with a document that is presented as being the same, that is, an original (in the sense of being the one originally presented for registration, or an exact copy, such as one of several print-outs). In many cases, this will be enough—the user may be satisfied with this level of authentication. In other cases, however, there may be a need to go one step further and be able to assure users (or auditing, regulatory, or other supervisory entities) that the contents of the database 440 themselves have not been tampered with, for example by being replaced with fraudulent documents, or with backdating of stored copies, etc. As mentioned, each individual record (registered document) in the database is preferably digitally signed to help address this problem—a fraudulent or backdated document image in the database will not have the proper signature or return a valid verification result, depending on what signature scheme is used. The same applies to the database contents as a whole—signing them will provide assurance that no tampering has occurred generally to the level of security of the signing scheme itself.

Many different signing schemes are known that are suitable for signing both individual documents and the database contents as a whole. For example, dozens of known vendors provide signing services. At present, the most common data-signing methods rely on some form of the PKI (Public Key Infrastructure). Such methods may be used as the signature system in implementations of the invention. A disadvantage of PKI-based digital signature schemes, however, is that they, too, require one to trust the authority that issues the PKI signatures, that is, the digital "keys". Even assuming such trust is justified, key-based solutions still have the drawbacks that digital certificates, keys, and the like can expire, the issuing authority may cease to exist, etc. For these reasons, the preferred implementation of this invention uses a keyless, distributed hash tree-based data signature method, which is provided by Guardtime AS of Tallinn, Estonia. This digital signing system will now be described so that one can better understand how users of the invention may rely on the integrity even of the database 440, regardless of whether or not they trust the signing authority.

Figure 4:
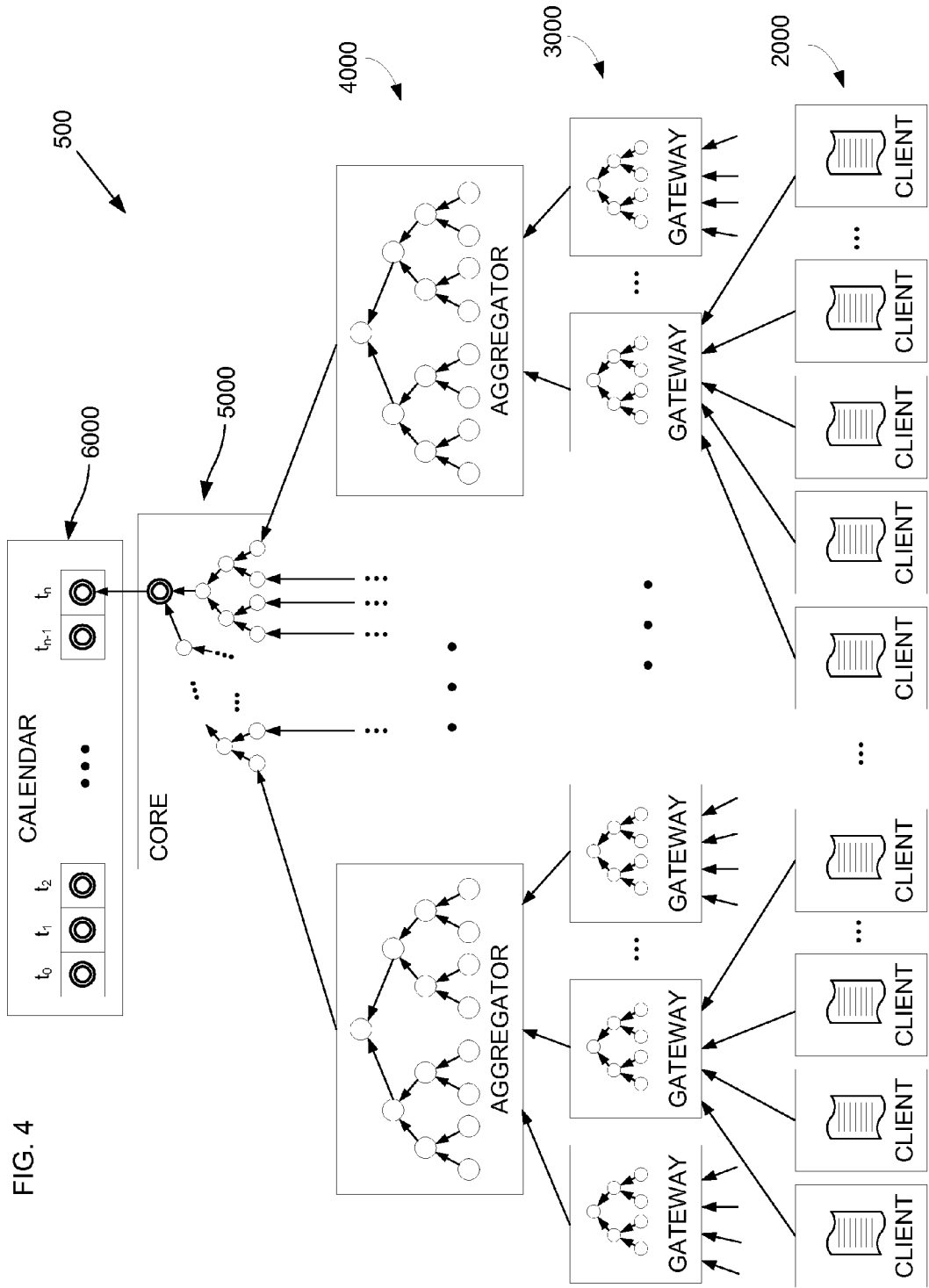
FIG. 4 illustrates various layers of a generalized digital record verification and signing infrastructure.
Figure 5:
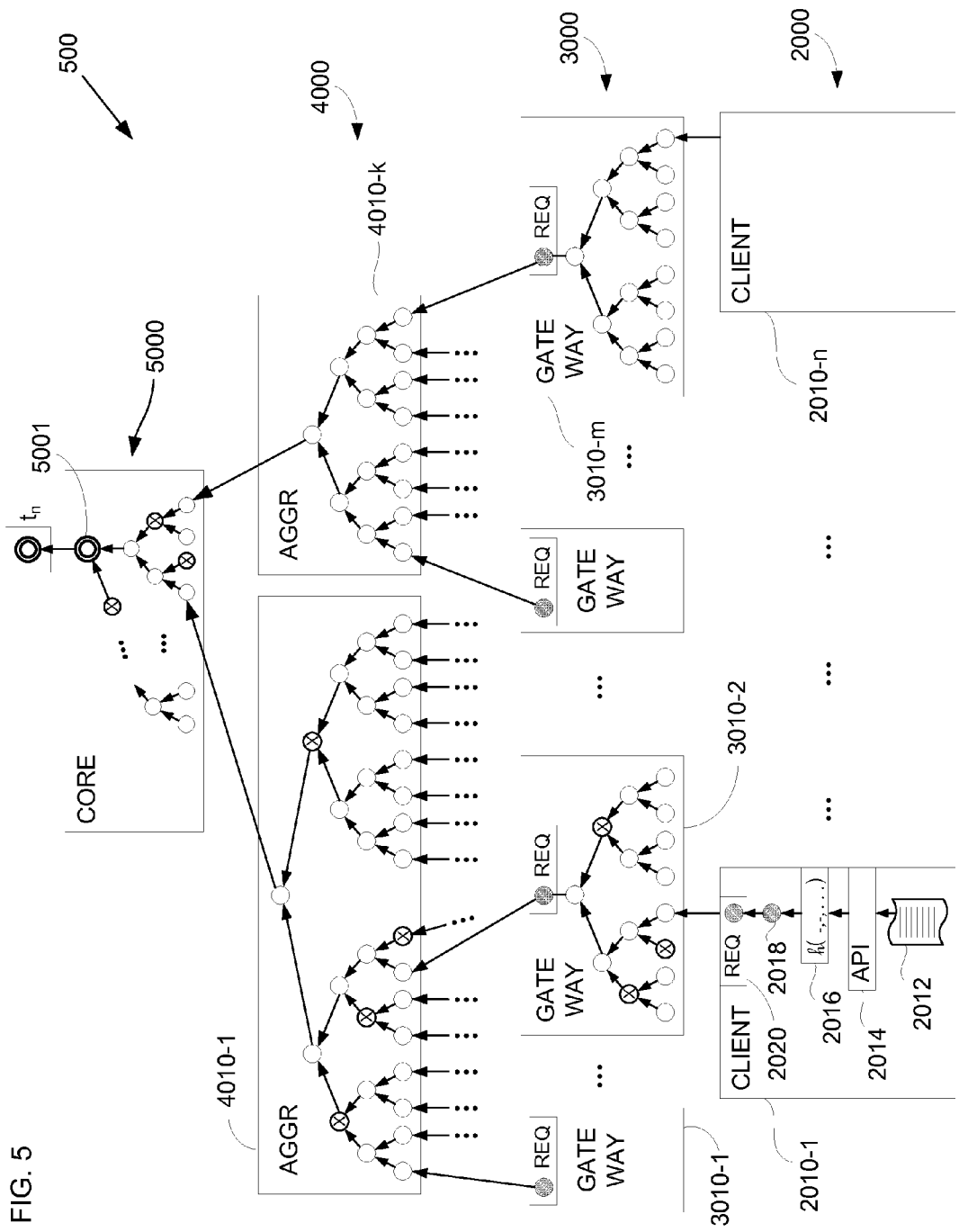
FIG. 5 illustrates the verification infrastructure along with various data and computational structures maintained and computed within the different layers.

As FIGS. 4 and 5 show, the general Guardtime infrastructure has several different layers: a client layer 2000 comprising a number of client systems; a layer of gateways 3000; a layer including one or more aggregation systems 4000; and an uppermost layer 5000 that includes the "core", which is described in greater detail below. Although FIG. 4 shows the various layers as being separate and distinct, some implementations of the main principles of the infrastructure might consolidate or do without some of the layers or might need to add additional layers for administrative or other purposes.

As FIG. 4 also illustrates, the core layer 5000 will in general be common to all users of the system, whereas lower layers 2000, 3000, 4000 will in many implementations have a unique configuration depending on the needs and preferences of users. The distinction between "core/common" and "unique/distributed" is not hard and fast, however—in some implementations, the core, that is, centrally administered system, will encompass structures and functions that also are used in lower layers. One of the advantages of this infrastructure is that it allows for almost unlimited scalability and reconfiguration of the non-core layers to meet particular implementation needs. All that is required is that the various layers perform the specified functions, with common protocols for entering a digital record into the verification system and for generating registration requests.

In the illustrated arrangement, a client is the system where digital records are prepared and entered into the verification/ signature system. In the context of the invention shown in FIGS. 1-3, the administrator system may be configured with the various components, described below, to function as a client in its own right. In other implementations, however, the client may be an entity to which the administrator system submits only a request for data signature, along with the content to be signed.

A gateway in the layer 3000 will typically be a computer system such as a server with which one or more of the clients communicates so as to receive requests for registration of each digital record that a client submits. In many implementations, a gateway will be a server controlled by an enterprise or some third-party provider, which may be a server known to and maybe even controlled by an organization to which the client user belongs, or a server accessed through a network such as the Internet. In short, a gateway may generally be any server located anywhere and configured to receive requests from clients for digital record registration. Gateway systems do not need to be of the same type; rather, one gateway might be a server within a company that employs many clients, whereas another gateway might be a server accessible online by arbitrary users. Of course, gateways could also be commercial systems, such that access for verification is granted only upon payment of a fee.

An aggregator in the aggregation layer 4000 will similarly be a computer system such as a server intended to receive registration requests that have been consolidated by respective gateways. Depending upon the scale and design requirements of a given implementation, any aggregator could also be controlled by the owner of the core, or the owner of the same systems as the gateways and clients, or could be provided by an entirely different entity, and in some cases it would also be possible to consolidate the aggregator and gateways for particular set of clients.

As an example, large corporations or government entities might prefer to implement and benefit from the advantages of the infrastructure using only their own dedicated systems. Nearer the other end of the spectrum of possibilities would be that the gateways and aggregators could all be configured using "cloud computing" such that a user at the client level has no idea where any particular gateway or aggregator is located or who controls the servers. One of the advantages of this infrastructure is that digital input records can still be verified with near total security even in situations where users and others do not know if they can trust the systems in the gateway or aggregation layers 3000, 4000; indeed, it is not even necessary to trust the administrator of the core 5000 in order to have essentially total reliability of verification.

The different terms "aggregator" in layer(s) 4000 and "gateway" in layer(s) 3000 are not intended to imply that the systems (such as servers) that comprises them are functionally significantly different—a gateway "aggregates" the requests of the clients it serves and as such could be viewed as a "local" or "lower level" aggregator in its own right. In many implementations, however, gateways may be under the control of entities more closely associated with the clients and aggregators will be more closely associated with the overall system administrator that maintains the core. This is not a hard and fast distinction, however.

FIG. 5 shows the infrastructure of FIG. 4 in more detail. In particular, FIG. 5 illustrates various data structures used in the authentication process. In FIG. 5, the various clients are represented as 2010-1, ..., 2010-n; gateways are represented as 3010-1, 3010-2, ..., 3010-m; and two (by way of example only) aggregators are shown as 4010-1, 4010-k. An aggregator will typically communicate into each of the lowest level hash tree nodes within the core. Only two aggregators are shown in FIG. 5 for the sake of simplicity.

In one implementation, each client system that wishes to use the verification infrastructure is loaded with a software package or internal system routines for convenient or even automatic communication and submission "upwards" of digital information. The software package may include some application program interface (API) 2014 that transforms submitted digital records into a proper form for processing. A digital record 2012 created, selected, or otherwise input in any way is then submitted by way of the API 2014 to a software module 2016 that uses the digital data from the record 2012 as at least one argument in a transformation function such as a hash function.

Cryptographic hash functions are very well known in many areas of computer science and are therefore not described in greater detail here. Just one of many possible examples of a common class of hash functions that are suitable for use in this infrastructure is the "secure hash algorithm" family (SHA-1, SHA-2, etc.).

Additional hashing within the client may be desired to include additional information depending on the design protocol of the infrastructure. Just a few of the many possible arguments the system designer might optionally choose to include as arguments of the additional hash function 2016 are an identifier of the person or entity requesting registration, an identifier of the particular client system being used, a time indication, information relating to the geographic location of the client or other system, or any other information desired to be incorporated as part of the registration request. A software module 2020 is preferably included to transmit the output of the transformation 2016 to higher layers of the infrastructure as a request (REQ), along with any other parameters and data necessary to communicate with a gateway and initiate the registration request.

It is assumed in this discussion that the transformation function 2016 is a hash function because this will be the most common and efficient design choice, and also because the properties of hash functions are so well understood; moreover, many different hash functions are used in the field of cryptology, security, etc., within commodity computers. One other advantageous property of hash functions is that they can reduce even large amounts of digital information to a size that is more easily processed, with a statistically insignificant chance of two different inputs leading to the same output. In other words, many well-known hash functions will be suitable for use throughout the infrastructure of this infrastructure, and can be chosen using normal design considerations. Nonetheless, the function that transforms digital records into a form suitable for submission as a request need not be a hash function as long as its properties are known. For example, especially for small digital records, it may be more efficient simply to transmit the digital record data as is, in its entirety or some subset; in this case, the transformation function may simply be viewed as an identity function, which may then also append whatever other additional information is needed according to the core system administration to form a proper registration request.

The data structure of a binary hash tree is illustrated within the gateway 3010-2. Each of the lowest level nodes will correspond to the transformed dataset 2018 submitted as a request from a client, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value as the result of application of a hash function that includes information derived from the digital input record(s) of every client that submitted a request to a gateway in the data structure under that aggregator. Although it is of course possible, the aggregator layer 4000 does not necessarily need to be controlled by the same system administrator that is in charge of the core layer 5000. In other words, as long as they are implemented according to the required protocols and use the correct hash functions (or whatever other type of function is chosen in a given implementation), then the client, gateway, and aggregation layers may be configured to use any type of architecture that various users prefer.

In one embodiment, the core 5000 is maintained and controlled by the overall system administrator. Within the core, a hash tree data structure is computed using the root hash values of each aggregator as lowest level inputs. In effect, the hash computations and structure within the core form an aggregation of aggregation values. The core will therefore compute a single current uppermost core hash value at the respective tree node 5001 at each calendar time interval t0, t1, . . . , tn. This uppermost value is referred to here alternatively as the "calendar value" or "current calendar value" for the time interval. Note that the time origin and granularity are both design choices.

Note that the uppermost tree node 5001 represents the root node of the entire tree structure of nodes junior to it. As is explained later, this will change upon recomputation of a new uppermost core hash value at the end of the next period of accumulating requests and generating signature vectors (also referred to as "data signatures") containing recomputation parameters.

In FIG. 5, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the siblings of the nodes in the direct recomputation path) and a knowledge of the hash functions applied at each successive parent node. In short, if a signature is associated with the digital record 2012 that includes all of the "X marked" values, and assuming predetermined hash functions (which may of course be the same or different functions), then re-computation of the hash values upward through all of the tree structures will yield the same value as in the current calendar value, but only if the starting input value representing the original digital record is in fact identical in every respect to the original. Even the slightest alteration to the digital input record of even a single bit in any of the values of the signature associated with a record 2012 will lead to a re-computed calendar value that is not identical to the one in node 5001. Note also that each uppermost computed value in the core—the current calendar value—contains information derived from every digital input record that is input into the system during the current calendar time interval.

Figure 6:
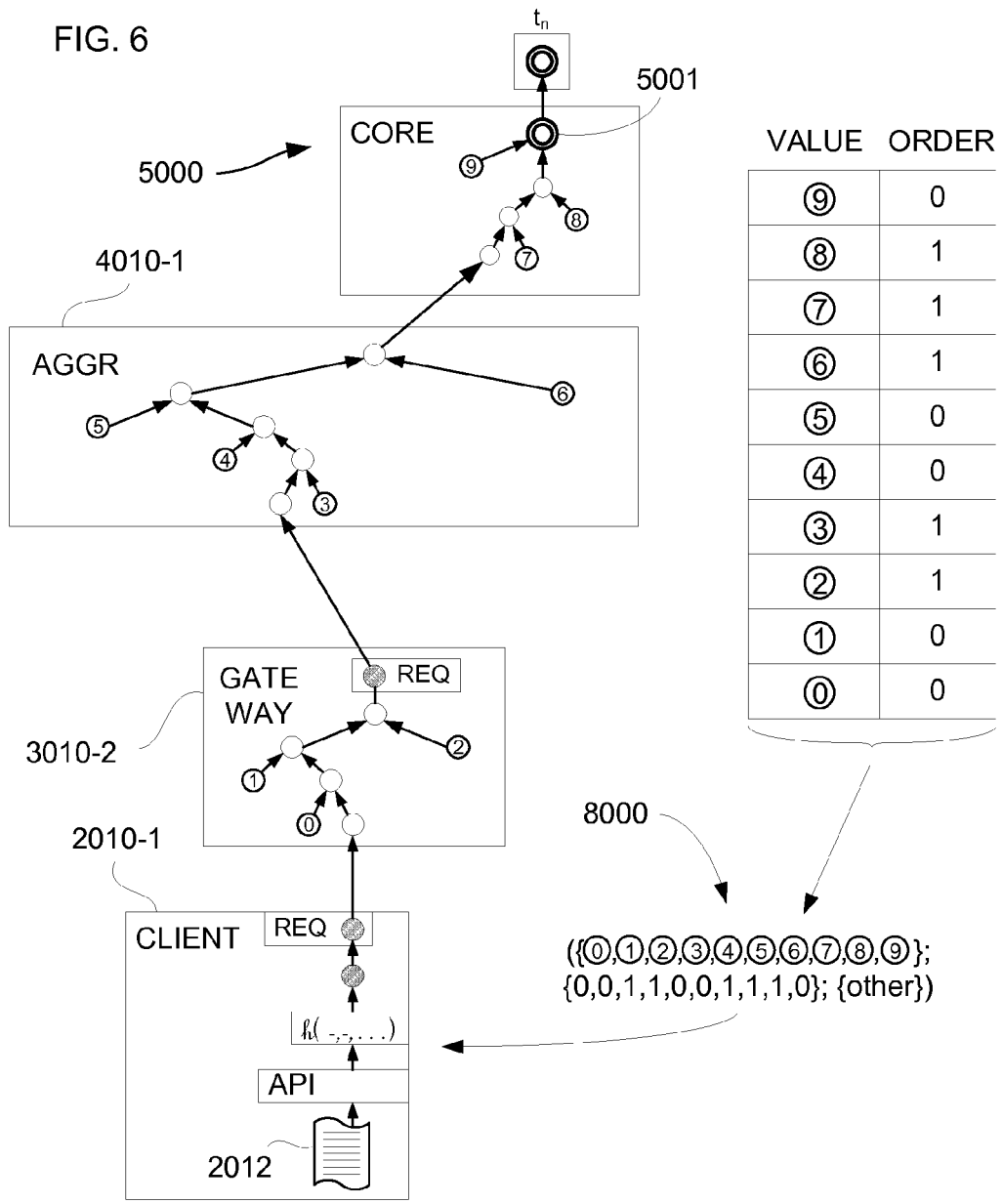
FIG. 6 shows a subset of FIG. 5 to illustrate a digital signature and recomputation of authentication values using the signature.

FIG. 6 illustrates the "reduced" infrastructure whose hash tree node values contain the information necessary to recompute the hash tree path all the way to the top of the system to the value in node 5001. It is not necessary for the recomputation to be carried out in any gateway, aggregator or the core; indeed, it is not even necessary for recomputation to take place within the same client 2010-1 that originally submitted the verification request for the digital record 2012. All that is necessary is the vector containing the "sibling" tree values at each level, as well as knowledge of which hash functions are used to compute each parent node. In other words, given this information, even a third-party would be able to perform the recomputation and compare with the node value 5001 and thereby either authenticate any given representation of what is supposed to be digital record 2012, or to detect any difference.

In FIG. 6, the sibling hash values needed for recomputation are numbered 0-9. If nodes are created in time order, and if order is important in the chosen hash function, then whether a sibling at each level is to the "right" or "left" in the hash structure will be relevant. In the example shown in FIG. 6, not only the value but also the order (0: from left, 1: from right) is indicated in the vector ({sibling values 0-1},{order bits}, {other}) returned along with any other chosen information as the data signature 8000. At this point, one may see one advantage of using a binary hash tree structure: at each level, there will be only one sibling value needed for upward recomputation. Although a non-binary tree structure would be possible, one would then have to accept the increased computational, storage, and data-structural complexity. Comparing FIG. 5 and FIG. 6, one can also see that the computational burden to validate one of a set of N digital input records at any given time interval is proportional to only $\log_2 N$.

To increase independence of the various layers—in particular, clients and later entities wishing to perform authentication through recomputation—it is advantageous for the entire calendar to be passed to the aggregators and even to the lower layers, even as far as to clients, every time a new calendar value is computed, that is, at the end of each calendar time interval. This then allows delegation and distribution of the computational workload without any compromise of the integrity of the system. Although it would be possible just to pass down the current calendar value if aggregators maintain a running database of calendar values, the entire calendar will typically not be large and can easily be transmitted entirely each time a new entry is computed. FIG. 4 therefore shows a database or file (the "calendar") 6000 that includes all calendar values from the beginning of system time. This would allow new aggregators, gateways and clients to join the infrastructure with minimal administrative burden and would enable recomputation and authentication of any digital record without having to involve levels higher than the client-level entity wishing to authenticate the digital record.

The core may return the data signature vector 8000 to clients and/or other layers directly, or it can be constructed or passed "downward" as a return. For example, when the core computes the current calendar value 5001 at the new calendar time interval, it may return to aggregator 4010-1 its sibling (X-marked) lowest core node value from aggregator 4010-k, and the aggregator 4010-1 can then return downwards the X-marked hash values to the gateway 3010-2, which in turn can return downwards to the client 2010-1 all of the above, plus the X-marked hash values computed within that gateway's hash tree structure. In other words, not only may the hash computation infrastructure be distributed over various layers (vertically) and also "horizontally" at each layer, but the responsibility for communicating requests upward and partial or entire signature vectors downwards can also be distributed and can be carried out simultaneously in many different locations. Of course, since a data signature is unique to the digital record that led to it, the procedure for returning a signature vector for each input digital record 2012 for client 2010-1 (note that a single client may input more than one digital record for verification in each time interval) is preferably duplicated for all digital input records received in the time interval over which values were accumulated for the computation of node value 5001.

The nature of the distributed infrastructure shown in FIG. 5 does not need to be static from one time interval to the next. Rather, each of the components below the core can be built asynchronously and independently of others; all that is needed for authenticating recomputation from a digital record up to the corresponding calendar value is the transformation function and other values that made up the original request, the vector of hash tree sibling values and knowledge of which hash functions are to be applied at each computation. Of course, the simplest case would be that the same hash function is used at every level. A somewhat more complicated choice would be to use the same hash function for all computations on a given level (within clients, within gateways, within aggregators, etc.) with variation between levels. Other even more complicated choices may of course be made as will be realized by those skilled in the art of such data structures and hash function computations. As long as the hash function used for each computation is known, the infrastructure will be able to validate a given input record.

In most cases, it is unlikely that the number of clients during a given computation interval will be exactly equal to a power of 2. Any known method may be used to adapt to the actual number of clients while still maintaining a binary hash tree structure throughout. As just one example of a solution to this, known dummy values may be used for all of the "missing" sibling node values. Alternatively, it is also possible to adjust the hash tree branches accordingly, in the manner of giving "byes" in single-elimination sports tournaments.

In one embodiment, the gateways 3000 may be more local to various clients whereas the aggregators are more regional. For example, it would be possible to locate aggregators in different parts of the world not only to distribute the workload, but also to increase throughput. Although it appears in FIGS. 4-6 that clients are associated with a particular gateway and gateways are associated with a particular aggregator, this is not necessary. Rather, client requests could be submitted over a network, and the first gateway that responds could then be associated with that client for that authentication transaction. Similarly, requests from gateways could be submitted to an open network and processed by whichever aggregator first establishes a connection. Locating aggregators and gateways both physically and logically in an efficient manner will therefore typically better distribute workload and reduce latency. This may not be desired in other implementations, however. For example, entities such as the government, defense contractors, or companies that wish to maintain strict security and tight control of the entire infrastructure could control and specify the relationship between all of the layers of the infrastructure, or any subset of these.

Assume now by way of example that some entity later wishes to verify that a digital record in question—a "candidate digital record"—is an identical copy of digital record 2012. Applying the same transformation function 2016 to the candidate digital record and recomputing upward using the corresponding data signature 8000, the entity should compute to the exact same calendar value that resulted from the original digital record's registration request. In some implementations, this level of verification is sufficient. As one possible example, if the calendar is distributed to enough independent aggregators, then if one malicious actor were to tamper with some calendar value, this could be detected if some procedure is implemented to compare with other copies of the same calendar.

As another example, in some implementations, users may choose or be obligated to rely on the security of the administrator of the core. In particular, government entities might implement a system in which users must simply rely on the government administrators. In these cases, recomputation up to the corresponding calendar value may be considered sufficiently reliable authentication. In the context of this infrastructure, this can be viewed as "first-level" verification. One hypothetical example of where such a system might be implemented would be where a government agency requires companies, laboratories, etc. to submit a copy of its calendar to the government entity every time the company's system updates its calendar. The government would then be able to audit the company's records and verify the authenticity of any given digital record by recomputing up to the proper calendar value, which the government will have stored. In practice, this would amount to requiring the company to keep updated a "calendar audit trail" with the auditing entity (such as the government).

Even in other instances, as long as the highest level system administrator trusts its ability to securely store calendars, it could be satisfied that a candidate digital record is authentic if recomputation leads to the appropriate stored calendar value. In a sense, it would be the system administrator itself in such cases that is looking for proof of the authenticity of candidate digital records as opposed to clients or other third-party entities. Consequently, the system administrator could trust the security of the recomputation and calendar values to the same extent it trusts itself to maintain the calendar copies.

All but the last digital record requesting registration in a calendar time period will typically need to wait for all other requests in the calendar time interval to be processed before a calendar value will be available that will enable authenticating recomputation. If the calendar time interval is kept short enough, this delay may be acceptable. To increase the level of security during the delay, it would also be possible to implement an option, whenever a client submits an authentication registration request, to generate and return not only the data signature vector but also a key-based signed certificate, which may be issued by any higher layer system such as the current gateway, aggregator, or even core.

Figure 7:
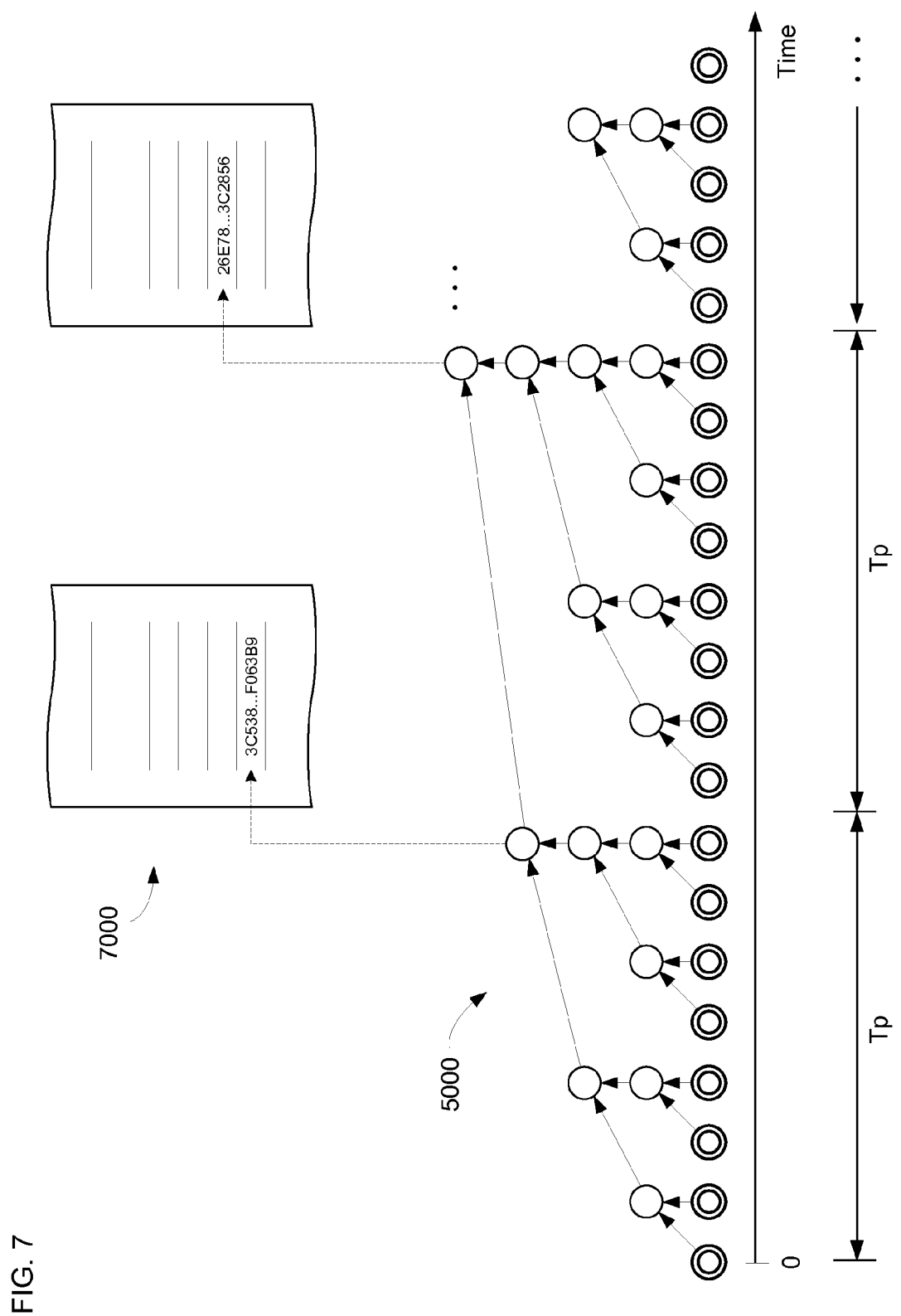
FIG. 7 illustrates publication to create a permanent trust-free authentication feature.

FIG. 7 illustrates an extension of the basic calendar-reliant verification process that provides "second-level" verification that is a method for permanent verification with no need for keys or trust of any entity, not even the administrator of the core. In FIG. 7, all of the calendar values computed over a publication time interval Tp are themselves used as inputs to an additional hash tree structure that is preferably hashed together (for example, using a Merkle tree structure) with previous calendar values to compute a composite calendar value (a "publication value") that may then be submitted for publication in some medium 7000 such as a newspaper, online posting, etc., that forms an unchangeable record of the composite calendar value. Here, the term "unchangeable" means that it would be practically impossible for even the most malicious actor—even if this is the core administrator— to alter every publicly available occurrence of the value. It is not necessary for "published" to be in any medium accessible to the general public, although this is of course one option that removes all need for a trusted authority; rather, a large or perhaps closed organization that implements the entire infrastructure on its own might simply choose to keep a database or journal of the composite calendar values in some secure logical or physical location.

Because of the various data structures and procedures of the distributed infrastructure, the published composite calendar value may encode information obtained from every input digital record over the entire publication time interval, and if the current calendar value for the current calendar period is hashed together with the previous one, which is hashed with the one before it, and so on, as shown in FIG. 7, then each published composite calendar value will encode information from every digital record ever submitted for registration from the beginning of calendar time at t0. This guarantees the integrity of the entire system: Changing even a single bit in a single digital record registered in the past will cause a different publication value to be computed, which would then not match the actual publication value. Once the composite signature value is published (that is, the publication value), there is never again any need to temporarily associate any signed digital certificate (which might be provided as before to increase security until the composite value is published, at which point it will not be needed) with the signature vector of the corresponding digital input record; rather, using the data signature vector and the calendar values (which are advantageously stored in each of the aggregators), one can then recompute hash values upward from any digital input record all the way to the published value. If the digital input record used in such recomputation leads to a match with the published value, then one can be certain to within the degree of certainty of the hash functions themselves that the digital input record being tested is identical to the one that originally received the corresponding signature vector.

Figure 8:
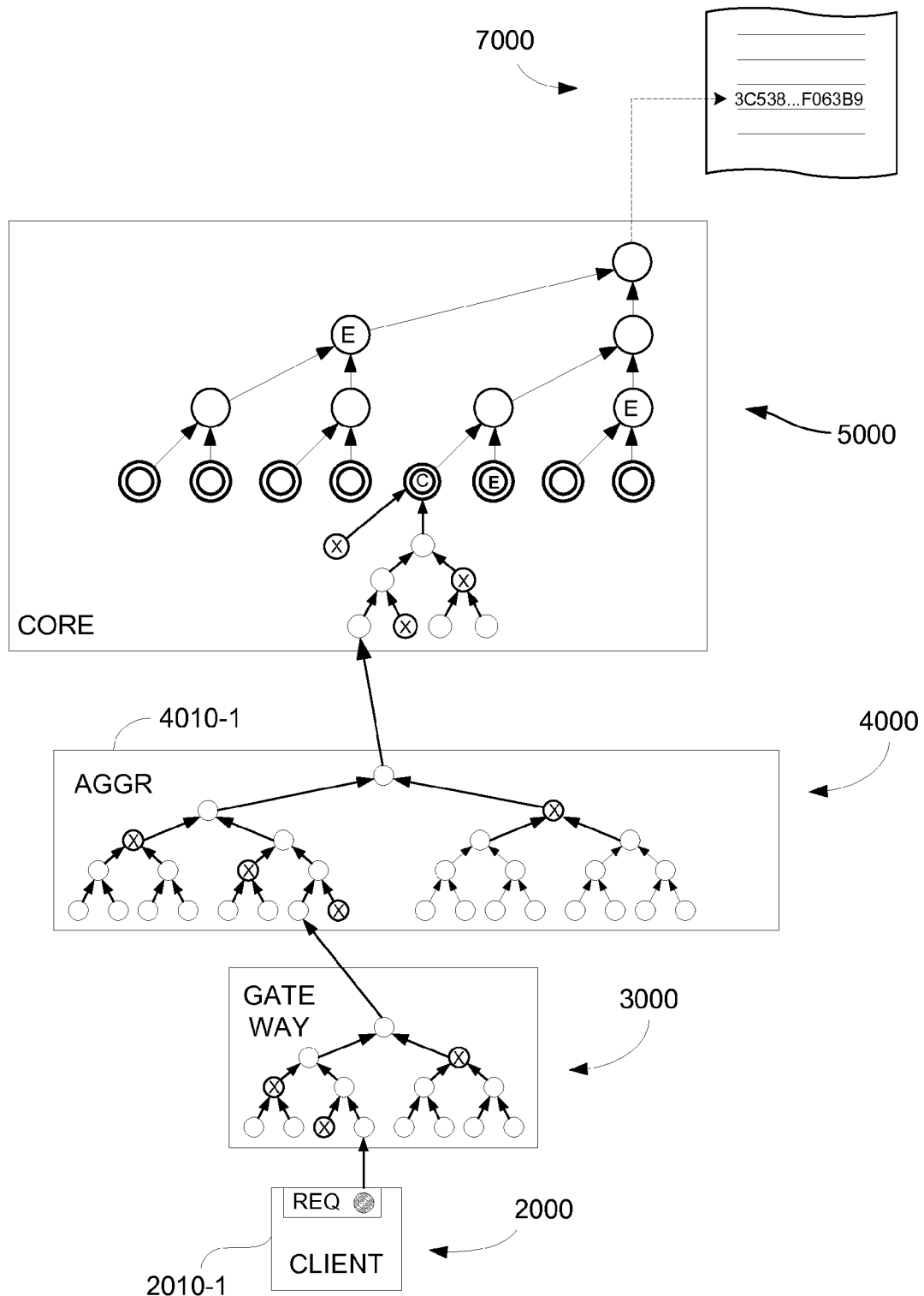
FIG. 8 illustrates extension of a digital signature to enable system-independent authentication by recomputation.

FIG. 8 illustrates an optional extension of the signature vector to include the values obtained during computation of the publication value as well. Assume as before that the "X-marked" nodes are the sibling hash values for the digital record corresponding to the request REQ from client 2010-1. The X-marked values are sufficient to recompute the calendar value marked "C", but the hash values in the nodes marked "E" in the data structure (in FIG. 8, the Merkle tree structure) within the core that converts calendar values into the publication value are necessary to recomputed all the way up to the published value 7000. At the end of the calendar period, the core therefore preferably extends or augments the signature vectors to include the "E" values, along with corresponding order bits as previously. With such an extended signature, any party can verify the authenticity of a given digital record as long as it has the extended signature vector, knowledge of the hash (or other) functions used, and the corresponding publication value—if recomputation leads to a match, then the digital record must be identical to the original; if not, then something has been altered. Note also that any change of order in the time of receipt for any to digital input records will also affect the computed values in the core as well as the published composite signature value.

In FIG. 7, eight calendar values are shown in each publication time interval Tp. In other words, in the illustration, the number of calendar time intervals in each publication time interval Tp is conveniently a power of 2. This may not be so in other implementations, depending on the choice of intervals. For example, if a calendar value is generated each second, but publication occurs only once every week (604,800 seconds), then there will not be a power of 2 number of calendar values as leaf nodes of the Merkle tree structure. As in other trees, this can be handled in a known manner as in giving "byes" in single-elimination sports tournaments by adjusting the tree branches, by using "dummy" inputs, etc.

Although it may in many cases be desirable or even required for the published value to encode information from the entire calendar from the beginning of calendar time, other alternatives can also be implemented as long as suitable bookkeeping routines are included. For example, rather than include all calendar values in the Merkle tree, at each publication time all of the most recent calendar values could be included in the publication computation along with a random sampling of calendar values from previous intervals. This would be one way, for example, to ensure that the number of included calendar values is conveniently a power of 2.

Similarly, in some contexts, government authorities require proof of records extending back only for some given time such as three years. In such cases it might be advantageous always to include only calendar values generated during this required period such that only relevant digital records are encoded in the most recent publication value.

Another alternative would be for there to be only a single computation of the publication value, including all calendar values from the beginning of system time. This might be useful, for example, in projects with clear time or digital record limits. For example, in litigation or transactions, parties often submit digital records to a "data room" for easy exchange. Calendar values could then be generated periodically as in other cases (perhaps with a longer calendar time interval since digital records will generally not be submitted as frequently as in large-scale, universally accessible implementations of the infrastructure's infrastructure), but with only a single computation of a publication value when all parties agree to close the data room. The publication value would then be a form of "seal" on the body of submitted digital records, which could later be used for recomputation and verification of any digital record ever submitted into the data room.

It is not absolutely necessary for the publication value to be computed using the Merkle hash tree data structure illustrated in FIG. 7. One alternative might be, for example, that all calendar values over the publication time interval are concatenated and then hashed as a whole together with a pseudo-random number, which then becomes part of the extended data signature vectors.

It is not a requirement for systems in any given layer to apply the same hash functions. For example, the transformation functions used in different client systems could be different. As long as the functions at each place in the recomputation path are known to whoever later wants to authenticate a digital record through recomputation, the authentication process will work properly. Adding a hash function identifier as an input parameter to the preparation of the registration request would be one convenient way to enable future users to correctly authenticate a digital record through recomputation.

As discussed about, each document (more correctly, it's stored digital representation) in the database 440 is preferably individually signed. This can be done by treating each document as an input record to the data signing infrastructure, or to some other chosen data-signing system such as one that is PKI-based. The entire contents of the database 440 will in general quickly grow to be too big to be submitted as a single digital input record to be signed. One way to solve this problem in the context of a Guardtime-based signing infrastructure would be to include, for example in the signing module 460, a software component similar to those in the core 5000 and illustrated in FIG. 7, to treat each registered document in the database as a lowermost leaf in a Merkle (or other) hash tree, and then reduce the contents of the database periodically, or upon each addition of some specified number (including one) of documents to the database, to a single (or at least fewer) uppermost hash value that then can be submitted as the digital record to be signed, or to a gateway or aggregator, or even directly to the core.

An alternative is to include in the administrator system 400 the components of a client 2010 and/or gateway and/or aggregator, such that initial hashing of each input record (newly received documents for registration) is done in, for example, the signature module 460.

In the figures, communication with the data signing system 500 (such as the keyless, distributed hash tree described above) occurs via the administrator 400. This is not necessary in all embodiments; rather, it would be possible for a verifier or other user to directly query the data-signing system using the signature vector for a given document instead of or in addition to downloading the signed electronic version of the document (for example, in pdf). This would allow the user to verify the integrity, time and origin of the digitally signed document independently of the admin system (400), in addition to or even instead of by visual comparison with the downloaded copy.

We claim:

1. A method for authenticating a document, comprising:
    in a registration phase:
        receiving from an originating entity a request to certify the document, as well as an electronic representation of the document;
        storing the electronic representation of the document in a database;
        returning to the originating entity a document identifier associated with the stored document and mappable to a database location indicator corresponding to the location of the stored electronic representation of the document in the database;
    in a verification phase:
        receiving a request to return to a verification-requesting entity a copy of the electronic representation of the document stored in the database, said request including the document identifier as extracted from a marking on a purported authentic copy of the document, said marking encoding the document identifier;
        returning to the verification-requesting entity the requested electronic representation of the document stored in the database, whereby a user can visually compare the purported authentic copy of the document with the returned electronic representation of the document stored in the database; and
        digitally signing the electronic representation of the document by inputting the electronic representation of the document as an original input record to a keyless, hash tree-based signing infrastructure, computing a data signature including recomputation parameters to a logically uppermost value in the hash tree, said recomputation parameters encoding information from other data sets than the document to be authenticated, whereby an arbitrary subsequent test digital record is considered authenticated relative to the corresponding original input record if, using the recomputation parameters to recompute upward through the hash-tree based infrastructure, the same uppermost value is attained as when it was originally computed with the corresponding original input record.

2. A method as in claim 1, further comprising generating an electronic version of the marking and returning to the originating entity the document identifier in the form of the marking incorporated into the requested electronic representation of the document stored in the database.

3. A method as in claim 2, in which the marking is chosen from a group comprising a one-dimensional bar code, a two-dimensional bar code, an alphanumeric character string, data for encoding into an RFID tag or smart chip, and data extracted from the document using optical character recognition (OCR).

4. A method as in claim 1, in which the document identifier is in the form of a portion of a Uniform Resource Location (URL) and the request is received over the Internet.

5. A method as in claim 1, further comprising returning to the verification-requesting entity the requested electronic representation of the document stored in the database as well as its corresponding digital signature.

6. A method as in claim 1, further comprising encoding the digital signature in the marking in addition to the document identifier.

7. A method as in claim 1, in which the document is one of a set of documents whose electronic representations are stored in the database, further comprising:
    digitally signing the set of documents stored in the database by inputting a representation of the contents of the database as an input record to a keyless, hash tree-based signing infrastructure, computing a data signature including recomputation parameters to a logically uppermost value in the hash tree, said recomputation parameters encoding information from other data sets than the document to be authenticated, said contents including a plurality of stored electronic representations of documents having been submitted in respective registrations phases.

8. A method as in claim 1, in which the verification-requesting entity is a portable device having a camera and decoding software module configured to capture the marking on the purported authentic copy of the document, extract the network-addressable locator from the marking, and submit the request to return the copy of the electronic representation of the document stored in the database corresponding to the network-addressable locator.

9. A method as in claim 8, in which the portable device is a network enabled device chosen from a group consisting of a telephone, a tablet computer, and a portable computer.

10. A method as in claim 1, further comprising associating an expiration time with the stored electronic representation of the document and returning to the verification-requesting entity the requested electronic representation of the document stored in the database only if the expiration time has not been exceeded.

11. A system for authenticating a document, comprising:
    a processor;
    a database;
    a memory;
    modules comprising instructions stored in the memory which, upon execution by the processor, cause the processor:
        to receive from an originating entity a request to certify the document, as well as an electronic representation of the document;

to store the electronic representation of the document in the database;

to return to the originating entity a document identifier associated with the stored document and mappable to a database location indicator corresponding to the location of the stored electronic representation of the document in the database;

to receive a request to return to a verification-requesting entity a copy of the electronic representation of the document stored in the database, said request including the document identifier as extracted from a marking on a purported authentic copy of the document, said marking encoding the document identifier;

to return to the verification-requesting entity the requested electronic representation of the document stored in the database, whereby a user can visually compare the purported authentic copy of the document with the returned electronic representation of the document stored in the database; and to obtain a digital signature associated with the electronic representation of the document stored in the database by submitting the electronic representation of the document as an input record to a keyless, hash tree-based signing infrastructure that returns a data signature including recomputation values to a logically uppermost value in the hash tree, said recomputation values encoding information from other data sets than the document to be authenticated, whereby an arbitrary subsequent test digital record is considered authenticated relative to the corresponding original input record if, using the recomputation parameters to recompute upward through the hash-tree based infrastructure, the same uppermost value is attained as when it was originally computed with the corresponding original.

12. A system as in claim 11, comprising a marking module including computer-executable code for generating an electronic version of the marking and returning to the originating entity the document identifier in the form of the marking incorporated into the requested electronic representation of the document stored in the database.

13. A system as in claim 12, in which the marking is chosen from a group comprising a one-dimensional bar code, a two-dimensional bar code, an alphanumeric character string, data for encoding into an RFID tag or smart chip, and data extracted from the document using optical character recognition (OCR).

14. A system as in claim 11, in which the document identifier is in the form of a portion of a Uniform Resource Location (URL) and the request is received over the Internet.

15. A system as in claim 11, further comprising returning to the verification-requesting entity the requested electronic representation of the document stored in the database as well as its corresponding digital signature.

16. A system as in claim 11, further comprising instructions for encoding the digital signature in the marking in addition to the document identifier.

17. A system as in claim 11, in which the document is one of a set of documents whose electronic representations are stored in the database, further comprising:

digitally signing the set of documents stored in the database by submitting a representation of the contents of the database as an input record to a keyless, hash tree-based signing infrastructure that returns a data signature including recomputation values to a logically uppermost value in the hash tree, said recomputation values encoding information from other data sets than the document to be authenticated, said contents including a plurality of stored electronic representations of documents having been submitted in respective registrations phases.

18. A system as in claim 11, in which the verification-requesting entity is a portable device having a camera and a decoding software module configured to capture the marking on the purported authentic copy of the document, extract the network-addressable locator from the marking, and submit the request to return the copy of the electronic representation of the document stored in the database corresponding to the network-addressable locator.

19. A system as in claim 18, in which the portable device is a network enabled device chosen from a group consisting of a telephone, a tablet computer, and a portable computer.

20. A non-transitory computer-readable storage medium having data stored therein representing software executable by a computer, the software including instructions for authentication of digital records, the storage medium comprising:

instructions for receiving from an originating entity, in a registration phase, a request to certify the document, as well as an electronic representation of the document;

instructions for storing the electronic representation of the document in a database;

instructions for returning to the originating entity a document identifier associated with the stored document and mappable to a database location indicator corresponding to the location of the stored electronic representation of the document in the database;

instructions for receiving a request, in a verification phase, to return to a verification-requesting entity a copy of the electronic representation of the document stored in the database, said request including the document identifier as extracted from a marking on a purported authentic copy of the document, said marking encoding the document identifier;

instructions for returning to the verification-requesting entity the requested electronic representation of the document stored in the database, whereby a user can visually compare the purported authentic copy of the document with the returned electronic representation of the document stored in the database; and instructions for obtaining a digital signature associated with the electronic representation of the document stored in the database, including instructions for submitting the electronic representation of the document as an input record to a keyless, hash tree-based signing infrastructure that returns a data signature, for computing validating recomputation values to a logically uppermost value in the hash tree, said recomputation values encoding information from other data sets than the document to be authenticated, whereby an arbitrary subsequent test digital record is considered authenticated relative to the corresponding original input record if, using the recomputation parameters to recompute upward through the hash-tree based infrastructure, the same uppermost value is attained as when it was originally computed with the corresponding original.

21. The computer-readable storage medium as in claim 20, further comprising instructions for generating an electronic version of the marking and returning to the originating entity the document identifier in the form of the marking incorporated into the requested electronic representation of the document stored in the database.

22. The computer-readable storage medium as in claim 21, in which the marking is chosen from a group comprising a one-dimensional bar code, a two-dimensional bar code, an alphanumeric character string, data for encoding into an RFID tag or smart chip, and data extracted from the document using optical character recognition (OCR).

23. The computer-readable storage medium as in claim 20, further comprising instructions for returning to the verification-requesting entity the requested electronic representation of the document stored in the database as well as its corresponding digital signature.

24. The computer-readable storage medium as in claim 20, further comprising instructions for encoding the digital signature in the marking in addition to the document identifier.

25. The computer-readable storage medium as in claim 20, in which the document is one of a set of documents whose electronic representations are stored in the database, further comprising instructions for obtaining respective digital signatures for the set of documents stored in the database by submitting a representation of the contents of the database as an input record to a keyless, hash tree-based signing infrastructure that returns a data signature including recomputation values to a logically uppermost value in the hash tree, said recomputation values encoding information from other data sets than the document to be authenticated, said contents including a plurality of stored electronic representations of documents having been submitted in respective registrations phases.

\* \* \* \* \*